Jan. 31, 1967
G. A. HELLAND
3,301,362
TANDEM CLUTCH
Filed Aug. 21, 1964
2 Sheets-Sheet 1
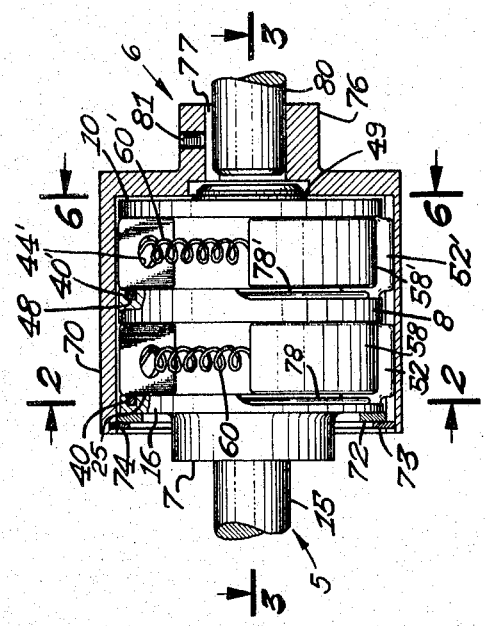
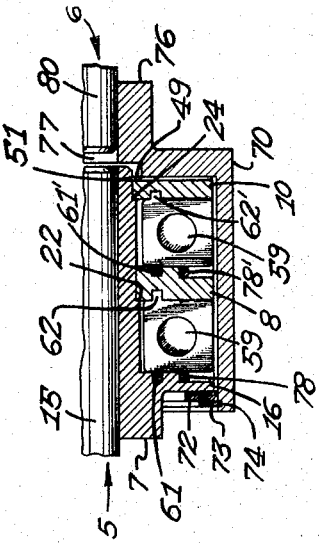
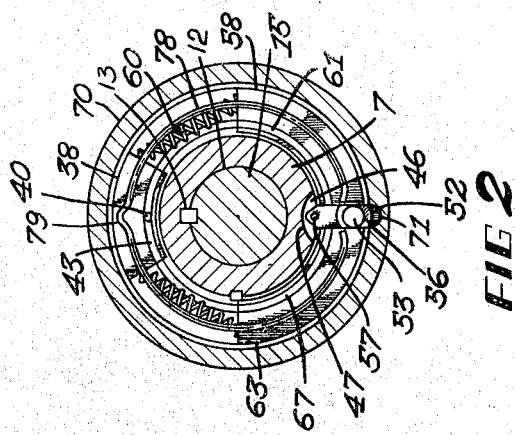
INVENTOR.
GILMAN A. HELLAND
BY Schroeder, Siegfried & Ryan
ATTORNEYS

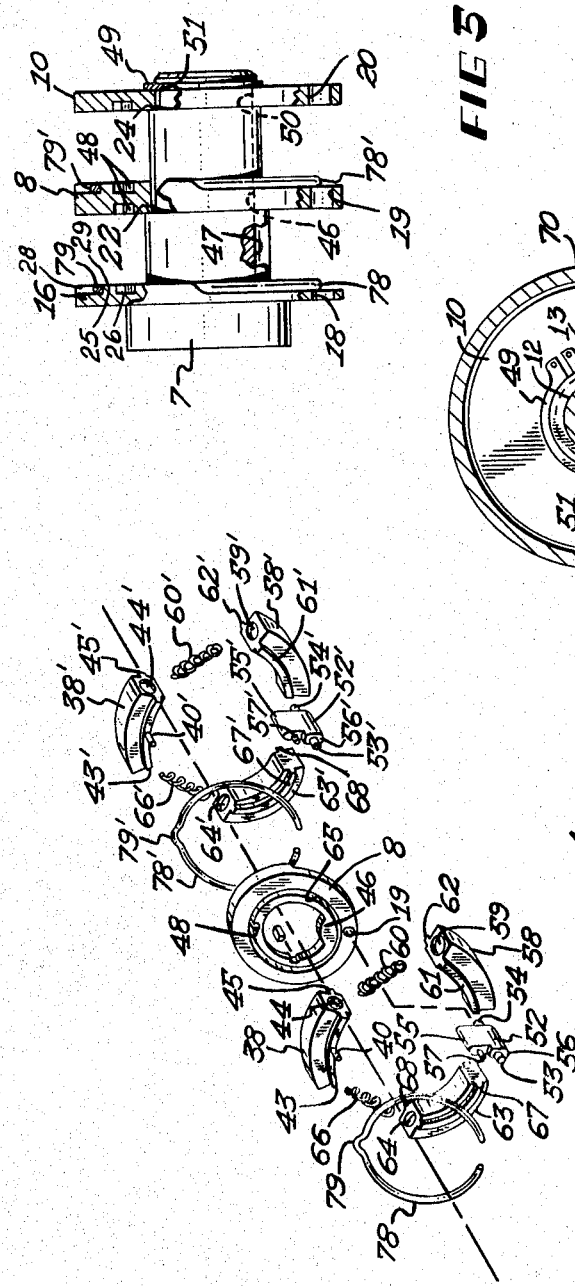

United States Patent Office 3,301,362
Patented Jan. 31, 1967

3,301,362
TANDEM CLUTCH
Gilman A. Helland, Wayzata, Minn., assignor to Helland, Inc., Navarre, Minn., a corporation of Minnesota
Filed Aug. 21, 1964, Ser. No. 391,092
1 Claim. (Cl. 192—56)

This invention relates to torque clutches and more particularly to an improved torque clutch of the automatically resettable type which utilizes a plurality of tandem clutch units to increase the torque carrying of the clutch which is resettable automatically after the withdrawal of excessive torque applied to the driven portion of the clutch.

Automatically resettable torque clutches have been devised and in use in the past, but they are generally unsatisfactory because of excessive wear, overheating, and complexity in structure. In my prior Patent No. 3,124,227, dated Mar. 10, 1964, on Automatically Resetting Torque Clutch, I have shown an improved clutch of this type which overcomes these disadvantages but is limited in application because of limitation on the torque handling characteristics. As such, the particular improved clutch is limited to the application of relatively small motors or equivalent structures. This structure is not adaptable for increase loading because it requires a substantially increased physical size of the clutch limiting the application of the same. The present invention is directed to an improved arrangement of an automatically resetting torque clutch of the general type shown in my prior patent which does not significantly increase the size of the clutch but permits a substantial increase in its torque carrying characteristics, thereby increasing the application of the same. This improved automatically resettable torque clutch utilizes a plurality of clutching members in a tandem relationship to maintain substantially the same overall circumferential and longitudinal dimension of the clutch while increasing the torque carrying characteristics of the clutch by a multiple of the number of clutch units employed.

It is therefore, an object of this invention to provide an improved tandem clutch which is of the automatically resettable torque type which is simple and inexpensive in construction, maintenance and operation.

Another object of this invention is to provide an improved clutch of this type which substantially increases the torque carrying characteristics of the clutch.

A further object of this invention is to provide a novel and improved torque clutch which is simple and inexpensive in construction and will automatically reset itself after having been released from a driving relation and upon removal of excessive torque and on rotation of the driving member.

A further object of this invention is to provide an automatically resetting torque clutch which utilizes a plurality of resiliently maintained driving connections between the rotary driving member and the rotary driven member, each of which resiliently maintain driving connections are constructed and range to substantially nullify the application of the torque on the connection as it moves to a non-driving position and so long as the driving member rotates rapidly and to re-establish the resilient connection as the driving member ceases to rotate.

These and other objects of this invention will become apparent from a reading of the attached description together with the drawings, wherein:

FIGURE 1 is a sectional view of the improved automatically resetting torque clutch, FIGURE 2 is a vertical sectional view of the clutch of FIGURE 1 taken along the lines 2—2 therein, FIGURE 3 is a fragmentary sectional view of the improved clutch showing a portion of the shiftable segments therein, FIGURE 4 is an exploded view of a portion of the element of the improved automatically resetting torque clutch, FIGURE 5 is an elevational view of a portion of the driving member of the improved automatically resetting torque clutch, and FIGURE 6 is an end elevational view of the improved automatically resetting torque clutch.

The improved tandem clutch as shown in the drawings as including a driving member, indicated generally at 5, and a driven member, indicated generally at 6. The driving member 5, as will be seen in the drawings, includes a flanged tubular member 7 with a pair of washers 8 and 10 positioned thereon. The washers 8 and 10 and the flanged tubular member when assembled form a pair of channels which will be best seen in FIGURE 5. Tubular member 7 has a bore 12 therethrough which is provided with a keyway 13 adapted to fixedly secure the tubular member 7 to a driving shaft 15 of a motor (not shown) or similar source of rotary power. The outwardly extending tubular flange 16 of the tubular member 7 has an aperture or opening 18 therein to provide a pivot or journal which extends therethrough. Similar apertures 19 and 20 appear in the washers 8 and 10.

In addition to the flange 16, tubular member 7 has a pair of shoulders 22 and 24 thereon defined by reduced sections of the tubular member remote from the extremity in which the driving shaft is inserted. The inner face of flange 16 of the tubular member 7 is provided with an annular rib 25 which extends in a circumferential direction relative to the flange and is not continuous in an area adjacent the aperture forming the journal 18. This rib 25 forms an inner circumferential extending channel or way 26. An axially extending peripheral flange 28 cooperates with the rib 25 to define a groove 29 therebetween. This peripheral flange 28 is also not continuous and in fact extends only substantially half way around the side of the flange opposite the aperture or journal 18.

Fixedly secured to the flange 16 at its inner face is an arcuately shaped block or segment 38. This segment 38 is secured to the inner face of the flange 16 by means of a pin 40 which is formed integral with the face or side of the segment 38. This pin 40 is received in an opening (not shown) in the inner face of flange 16 so that segment 38 cannot rotate relative to the flange. An arcuately shaped laterally extending rib 43 on the segment 38 fits into the way 25 to aid in holding the segment 38 in the fixed relation. A recess 44 is formed in each end of the fixed segment 38 for purposes to be hereinafter defined. Further, segment 38 has a second laterally extending rib 45 formed in the opposite side relative to the rib 43. A projection (not shown) in the segment 38 extends in the opposite direction from the opposite side of the projection 40 which fits into an aperture 48 in washer 8 and also serves to position segment 38 in the channel between the washer 8 and flange 16.

The washer 8 which is best shown in FIGURES 4 and 5, is also provided with a key segment 46 which fits into a keyway 47 in the tubular member 7 and which extends throughout the extent of the tubular section beyond the shoulders 22, 24 thereon. Washer 10 is also mounted on the tubular extension and includes a projection 50 adapted to fit into the keyway 47 in the tubular member to position in the washer thereon. It forms with washer 8 a second channel in which is positioned clutch elements identical with that in the first mentioned channel. Since the construction of the individual clutch elements of the tandem clutch are identical, only one will be described in detail and the clutch elements disposed between washers 8 and 10 will be referred to as similar parts having numbering with a prime behind the number. Thus the first tandem clutch elements are mounted and positioned between the washer 8 and the flange projection 16 and on the tubular member 7 while the second group of elements are positioned in the channel between washer 8 and the washer 10. Washer 10 is held on the tubular member 7 by means of a locking spring 49 which fits into an annular groove 51 in the end of the tubular member 7 to positively retain the washer 10 thereon and positioned adjacent and in contact with the shoulder 24 with the key portion 50 positioned in the keyway 47 to accurately position and rigidly secure the washer 10 on the tubular member 7.

The first of the tandem clutch elements includes a pivotally mounted toggle member 52 which is journalled in the journal openings or pivots 18 and 19 in the cylindrical flange 16 and the washer 8. This toggle member has a pair of journal pins 53, 54 which extend laterally from opposite sides and are adapted to be received in the journals 18, 19. As will be best seen in FIGURE 1, the toggle member has a longer lever arm 55 and a shorter lever arm 56, the latter of which extends outwardly beyond the flange 16 of the tubular member and outwardly beyond the washer 8. The shorter lever arm 56 is a portion of the toggle member which performs the driving function by engaging the driven member 6. A reset pin 57 also extends laterally from the longer arm 55 of the toggle member.

Bearing against one side of the toggle member 52 is one end of an arcuately shaped segment or block 58. The end which bears against the toggle element is flat and extends radially relative to the curvature of the segment. The opposite end of the segment has a recess 59 formed therein which is adapted to receive one end of a short coil spring 60. The opposite end of the coil spring 60 is received within the recess 44 of the fixed segment 38. The spring 60 is of such length that it constantly urges the segment 58 against the longer lever arm 55 of the toggle member 52. At one side of the segment 58, there is an arcuate shaped rib 61 which extends outwardly. At the opposite side of the segment 58 is a second similar rib 62. The rib 62 rides within the angular groove or way 65 located in the washer 8. The rib 61 rides within the channel 26 of the tubular element 7 so that the segment 58 is capable only of circumferential movement relative to the two rotary members 5 and 6.

At the opposite side of the toggle 52 there is a second circumferentially shiftable segment 63 which has a radially extending end face bearing against the toggle element and which has a recess 64 formed in its opposite end. The recess 64 is adapted to receive one end of a coil spring 66 therein while the opposite end of the spring 66 is received within the recess 44 of the fixed segment 38 in an identical manner to that in which the spring 60 is received at its opposite end. The segment 63 has an arcuately shaped rib 67 at one of its sides and a second and a similarly shaped and arranged rib 68 at its opposite side. The rib 68 is received within the groove or way 65 of the washer 8 and the rib 67 extends into the way 26 so that the segments 53 may shift circumferentially of the flange 16 of the tubular member 7 but only in that direction. The spring 66 is of such length as to constantly urge the segment 63 against the longer lever arm 55 of the toggle member 52.

A resilient annular split spring 78 which is round in cross-sectional configuration and is normally smaller in diameter than the circumference of the rib 25 is snapped into place around the rib 25 so as to fit snugly therearound and have its free end positioned laterally of the longer lever arm 55 of the toggle 52 but in position to engage the reset pin 57 thereof when the toggle member 52 shifts to a substantially circumferentially extended position. Normally the spring 78 does not engage any portion of the toggle member 52 but when the toggle member shifts to disengaging position such that the shorter lever arm 56 does not extend outwardly beyond the washer 8 or the flange 16, one of the free ends of the spring 78 will bear against the reset pin 57 and gently urge the toggle member 52 toward radially extending position again. It will be noted that the spring 78 is positioned with a slight deformation 79 which is adapted to fit around a small detent (not shown) formed in the peripheral flange 40 in order to insure that the spring 78 will not move circumferentially.

Within the channel formed by the washer member 8 and washer 10 is a second structure identical in construction to that previously described a second clutch element of the tandem clutch unit, which as will be later noted, cooperates with the driven member 6 in the same manner as does the structure previously described. For purposes of simplicity, these elements are identified and numbered with a prime notation after the number and will not be discussed in detail. It will be recognized, however, that the toggle 52' is pivoted through its pivoted members 53', 54' within the apertures or pivots 19 and 20 of the washer members 18 and 10 and that the fixed segment 38' cooperates with the movable segments 63' and 58' to bear against the toggle member 52'. Similarly, the loop spring 78' of the second clutch element cooperates with the detent 57' of the toggle 52' to reset the clutch.

While we have shown two such clutch elements in tandem relationship, it will be recognized that a plurality of such units may be employed within the scope of the present invention for the purposes to be hereinafter outlined.

The driven member 6, as shown, consists of a cup-shaped member 70 which has an axially extending groove 71 formed in its inner surface and adapted to receive the shorter lever arm 56, of the toggle members 57, 52, therein. As best shown in FIGURES 1 and 2, the driven member 6 encircles the driving member 5 and is secured thereto by a snap ring 72 which bears against a washer 73 and snaps into a groove 74 on the inner surface of the cup-shaped member 70. The similar but smaller snap ring 49 fits into the groove 51 in the end of the tubular member 71, as will be best seen in FIGURES 5 and 6 locks the washers 8 and 10 on the tubular member 7 and holds the engageable clutch elements or toggle members and their associated assembly in assembled relationship.

The driven member 6 has a hub 76 at its opposite end which is provided with a bore 77 therein to receive a driven shaft 80 and to be secured thereto by a key which is held in place by a set screw 81.

When the unit described above is assembled as shown in FIGURE 1, it will be seen that the circumferentially shiftable segments 58, 63 and 58' and 63' normally urge the toggle elements 52 and 52' to the radially extending position relative to coaxially assembled driving and driven members 5 and 6 respectively. Because of the length of the longer lever arms 55, 55' a substantial amount of torque is required to cause the shorter arms 56, 56' to swing out of the groove 71 of the cup-shaped member 70 to a non-driving position. It will be readily appreciated that the torque at which the clutch will release can be predetermined by varying the length of the lever arms, the length of the circumferentially shiftable segments or by varying the length or strength of the springs 60, 66, 60', 66'. Similarly the fixed elements 38, 38' may be made shorter or longer to provide the desired effect.

In the improved tandem clutch, the use of the plurality of clutch elements in a tandem relationship permits the use of a driving and driven member of substantially the same diametrical dimension and length, but with substantially increased torque carrying characteristics. Thus by the use of two such tandem clutch elements in place of a single clutch element, the improved tandem clutch can be designed to release at a torque substantially twice that required to be exerted by the driven member for the single clutch unit. This permits a very compact and simple arrangement of parts in a clutch member which substantially increases the range of usage of the clutch and permitting it to be applied to substantially larger power units without substantially increasing the size or cost of the clutch.

In the operation of a clutch, when the predetermined torque has been exceeded, the shorter lever arms 56, 56' act simultaneously and will be caused to swing in a direction in which the torque is applied by driven member 6 or conversely the longer lever arms 55, 55' will swing in the direction in which the torque is applied by the driving member 5. When this occurs, the toggle members 52, 52' will force the circumferential shiftable segments associated therewith outwardly relative to the toggle member. The toggle members will then assume a position such that the shiftable elements associated therewith will be working against one another and a pressure applied by each will be working against the pivot pins 53, 54, 53', 54' of the toggle members 52, 52', thereby substantially nullifying the entire urging of the shiftable segments. Because the urging of the segments has been nullified for each of the clutch members, there is no tendency for their respective toggle members 52, 52' to return to the radially extending position relative to the members 5 and 6 and hence the device can continue to rotate without any appreciable friction between member 5 and the driven member 6. With this friction free arrangement, it is possible for the unit to run for many hours without damage thereto and without any appreciable wear upon the groove 71. As a result, a torque clutch of this construction will maintain its accuracy throughout long periods of usage and despite frequent disengagement caused by overloading. Further the clutch of this construction may run for hours with the clutch elements or driving elements 52, 52' in the non-driving position without serious damage to the clutch and without danger to the source of rotary power.

When the speed of the driving member 5 is reduced such that it approaches a stopped position, the clutch will automatically reset into a synchronized position with the driven element 6. Preceding these circumstances, the toggle elements 52, 52' will have been shifted to the non-driving position such that the ends of the elements are substantially aligned with their axis of pivot and are positioned between the ends of the shiftable elements 58, 63 and 58', 63'. The reset pins 57, 57' on each of the elements 52, 52' engage the free ends of the springs 78, 78' and since these springs are relatively weak as compared to resilient urging applied to the shiftable elements through their respective springs 60, 66, 60', 66' these smaller springs will normally have no effect until the clutch is in the disengaged position and the speed is slowed down. The forces of the springs 78, 78' are, however, sufficient to urge the respective toggle members 52, 52' back toward the radially extended position when the driving member ceases to rotate or approaches this condition. Thus it will be readily seen that the only force tending to urge the shorter lever arm into engagement with the groove 71 in the cup-shaped member 70 of the driven member 6 when the respective toggle members are in the non-driving position is the relatively light urging of the respective springs 78, 78' against the reset pins 57, 57'. The extent of this urging is so slight that no damage will result to the groove defining position of the groove 71 and yet it is sufficient such that when the driving member 5 and the toggle elements 52, 52' move around to the position opposite the groove 71, the toggle elements 52, 52' will also be moved to the radially extending position. Immediately upon these elements returning to the radially extending position, the relatively strong urging from the respective segments 58, 63 and 58', 63' will again come into play for they will snap into their original position whereat the ends thereof abut against the longer lever arms 55, 55'.

It will be noted that the shiftable elements 58, 63 and 58', 63' of the respective clutches together with their fixed segments 38, 38' are so positioned that they do not bear against the inner surface of the cup-shaped member 70 and do not extend outwardly as far as the periphery of the washers 8 and 10 or the flange 16 of the driving member 5. Likewise it will be noted that because of the coaxial relationship and relative size of these members, the flange member 16 and the washers 8 and 10 do not bear against the interior surface of the cup-shaped member 70. This arrangement provides for substantially friction free rotation when the toggle elements 52, 52' have been moved to the non-driving position wherein they are opposed by the opposite urging of the shiftable elements 58, 63 and 58', 63' which urging is substantially nullified.

It will be noted that the springs 78, 78' are entirely separate from the resilient urging of the springs 60, 66 and 60', 66' which bear against the shiftable elements. It should also be noted that the springs 78, 78' do not come into play until such time as the action of the springs 60, 66 and 60', 66' are completely nullified. Further the improved tandem clutch may be operated accurately in either direction without adjustment thereof. In addition it will automatically reset at the torque for which it was originally set regardless of the direction of rotation in which the torque is applied. The improved tandem clutch provides for an improved arrangement of substantially increasing the torque carrying capacity of the clutch without appreciably increasing the dimensions thereof. The substantially identical elements employed therein permit the simplification in the structure of the larger clutch having the same physical circumferential or diametrical dimensions may with a slight increase in the axial dimension of the clutch to substantially increase the torque output thereof.

In considering this invention it should be remembered that the present disclosure is intended to be illustrative only and the scope of the invention should be determined by the appended claim.

What is claimed is:

An automatically re-setting torque clutch comprising, a rotary driving member, a rotary driven member arranged concentrically with said driving member, a plurality of torque transmitting elements pivotally carried by one of said members and each having an inwardly extending lever arm of a given length and outwardly extending lever arm of a less length and normally extending between said members and forming a driving connection therebetween and being movable between a driving and a non-driving position relative to one of said members, resilient means carried by said member which carries said plurality of elements and having portions engaging respectively said plurality of elements and normally urging each of said plurality of elements from opposite directions into driving relation between said members, said portions being yieldable and disposed at opposite sides of each of said elements opposite its axis of pivot and movable away from the elements in opposite circumferential directions relative to its carrying member to permit said element to move to a non-driving position whereat the urging of said means is essentially nullified when a predetermined torque is exerted upon said elements by the driven member, and separate relative weak resilient means engaging the torque transmitting elements and urging the same toward driving position between said members when said elements are in non-driving position and re-established as soon the driving members cease to rotate after said elements have been moved to non-driving positions, said elements being positioned in tandem relation on one of said members, said one of said members including a flanged tubular member having a plurality of axially spaced shoulders defined by reduced sections, washers keyed on said tubular member in contact with each shoulder and separating said elements, said elements being elongated and having opposite ends and said first mentioned resilient means remaining in engagement at all times with said elements but having their urging nullified by said elements moving to non-driving positions at which positions the urging of said means are against the ends of said elements and along their length.

References Cited by the Examiner

UNITED STATES PATENTS

| | | | |
|---|---|---|---|
| 1,669,225 | 5/1928 | Bayles | 192—56 |
| 1,920,017 | 7/1933 | McClatchie | 192—56 |
| 2,253,466 | 8/1941 | Grohn | 192—56 |
| 2,909,047 | 10/1959 | Waltersheid-Muller et al. | 192—56 X |
| 2,930,212 | 3/1960 | Walterscheid-Muller et al. | 64—29 |
| 2,955,443 | 10/1960 | Fulop | 192—56 X |
| 3,124,227 | 3/1964 | Helland et al. | 192—56 |

DAVID J. WILLIAMOWSKY, *Primary Examiner.*

A. T. McKEON, *Assistant Examiner.*